Nov. 6, 1951 A. MOTTU 2,574,119
OPTICAL CONTROLLING OR INSPECTING ARRANGEMENT FOR VERIFYING
THE CROSS SECTIONS OF PIECES WITH COMPLEX PROFILES
Filed Oct. 25, 1949 5 Sheets-Sheet 1

Inventor
André Mottu
By Robert E. Burns
Attorney

Nov. 6, 1951     A. MOTTU     2,574,119
OPTICAL CONTROLLING OR INSPECTING ARRANGEMENT FOR VERIFYING
THE CROSS SECTIONS OF PIECES WITH COMPLEX PROFILES
Filed Oct. 25, 1949     5 Sheets-Sheet 5

INVENTOR
ANDRÉ MOTTU
BY Robert E. Burns
ATTORNEY

Patented Nov. 6, 1951

2,574,119

UNITED STATES PATENT OFFICE 2,574,119

OPTICAL CONTROLLING OR INSPECTING ARRANGEMENT FOR VERIFYING THE CROSS SECTIONS OF PIECES WITH COMPLEX PROFILES

André Mottu, Genthod-Geneva, Switzerland, assignor to Societe Genevoise d'Instruments de Physique, Geneva, Switzerland, a firm of Switzerland Application October 25, 1949, Serial No. 123,358
In Switzerland October 28, 1948

3 Claims. (Cl. 88—24)

The present invention relates to an optical controlling or inspecting arrangement for verifying the cross section of members that have complex profiles, for example, blades of compressors or turbines.

These blades have to possess twisted surfaces which are accurately calculated according to the laws of flow of the liquid or gaseous fluids, so as to obtain maximum efficiency from the blading and to prevent turbulence phenomena. These shapes or forms are difficult to design, and difficult to construct in practice; and the controlling of their production is very complicated.

Controlling or inspecting methods have been proposed taking point by point the profile of the various transverse sections of the same blade and comparing the results of the measurements made point by point with a theoretical tracing of the different sections. These procedures are however very laborious.

The purpose of the present invention is to provide an optical arrangement which allows a much more rapid control or inspection by forming an image of the apparent contour of the various sections of the member to be examined, which is projected with magnification on to a known projection screen.

The invention is characterized by a lighting system comprising at least two electric bulbs placed about the body to be examined, the image of the filaments of these bulbs being projected on to the said body by means of objective lenses designed to produce, in the plane of the section to be observed, which is perpendicular to the optical axis of the projector, a line of light the contour of which is observed on the screen, through a support carrying the object allowing a displacement of the object to be examined parallel to the optical axis of said projector over a given length.

In order to collect a maximum amount of light in the objective lens of the projector and to obtain great clearness of the image projected upon the screen, the surface of the object to be examined is rendered suitable for diffusing the light forming the line by covering this surface with a suitable coating, which may advantageously consist of a very white granular structure, for example, a thin deposit of magnesium oxide powder.

The invention is illustrated, by way of example in the accompanying drawings, in which.

Figure 1:
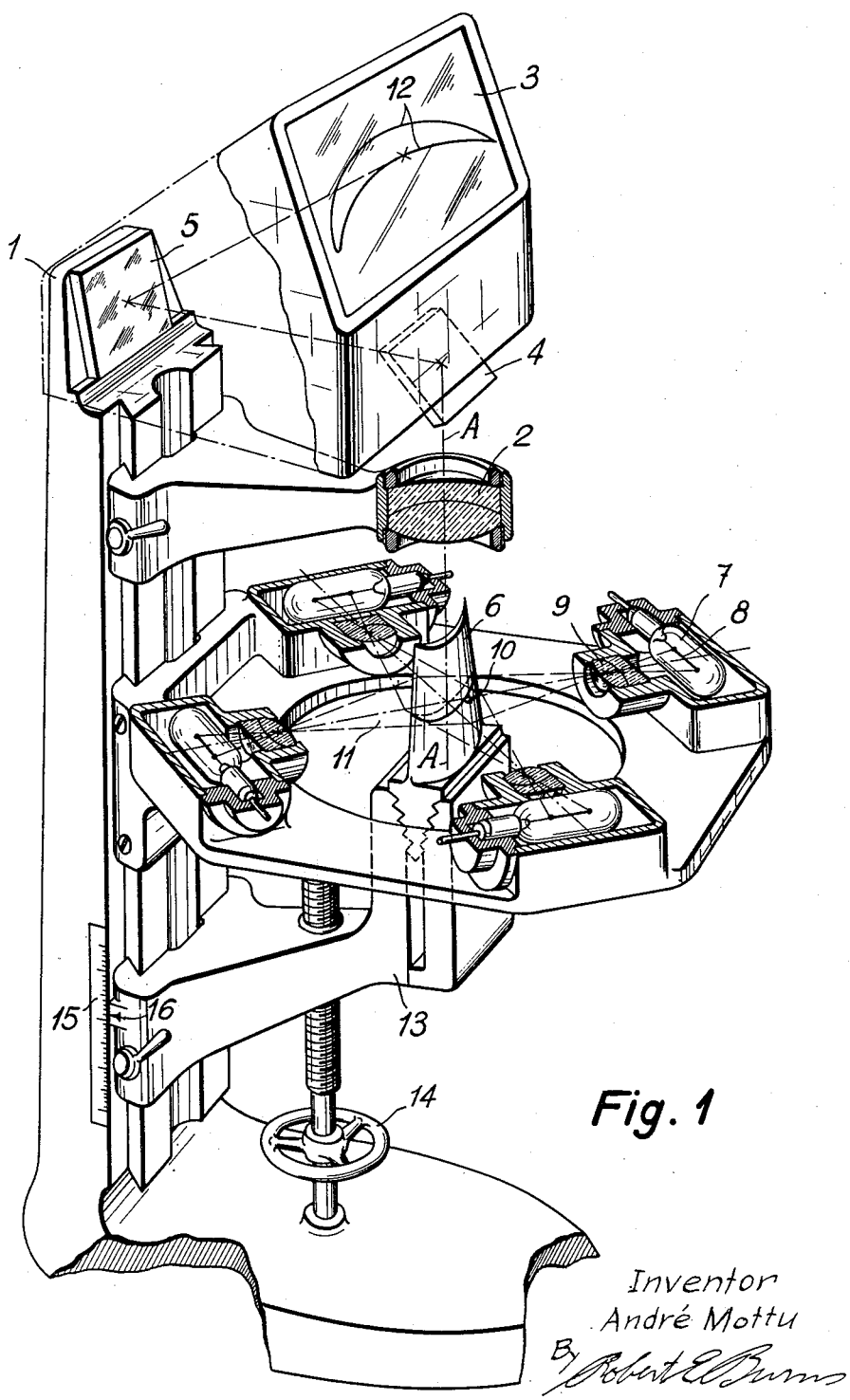
Figure 1 shows diagrammatically and in perspective one form of construction of the invention.

In these drawings, A—A is the optical axis of the projector 1. 2 is an objective lens which allows the projection on to a screen 3, through the medium of mirrors 4 and 5, of an image of the part 6 to be controlled or checked, which may for example be a blade of a rotary air compressor or of a gas turbine. 7 is an electric bulb with a rectilinear filament 8. 9 is an objective lens by means of which an image of the filament 8, represented in Figure 1 by a thick line 10, is formed on the surface of the blade 6.

A sufficient number of lighting arrangements, four for example, are mounted on a fixed support 17 and arranged around the blade 6. Their optical axes are all exactly in the same plane 11, which is perpendicular to the axis A—A. In this way the various images 10 of the filaments are located in succession to each other and are even in part superimposed, thus forming a continuous line of light about the blade.

It would be also possible to obtain the same effect, but with lower optical efficiency, by utilising as the lighting arrangement a punctiform source of light, and cylindrical lenses giving a linear image of this point source.

Owing to the presence of the diffusing coating on the blade a sufficient quantity of the light emitted by the filaments 8 will be diffused in the direction of the lens 2 to form on the screen 3 a perfectly clear image 12 of the line of light 10, and consequently of the contour of the section of the blade in the plane 11.

The blade is fixed in a support 13 for holding the object or article, which, through a regulating arrangement 14, can be displaced parallel to the axis A—A, so as to allow an examination of the profile of the blade at different portions of its length. Measuring means, for instance a graduated scale 15 and a pointer 16, are provided for the purpose of determining the exact position of the various sections of the blade to be examined.

Figure 2:
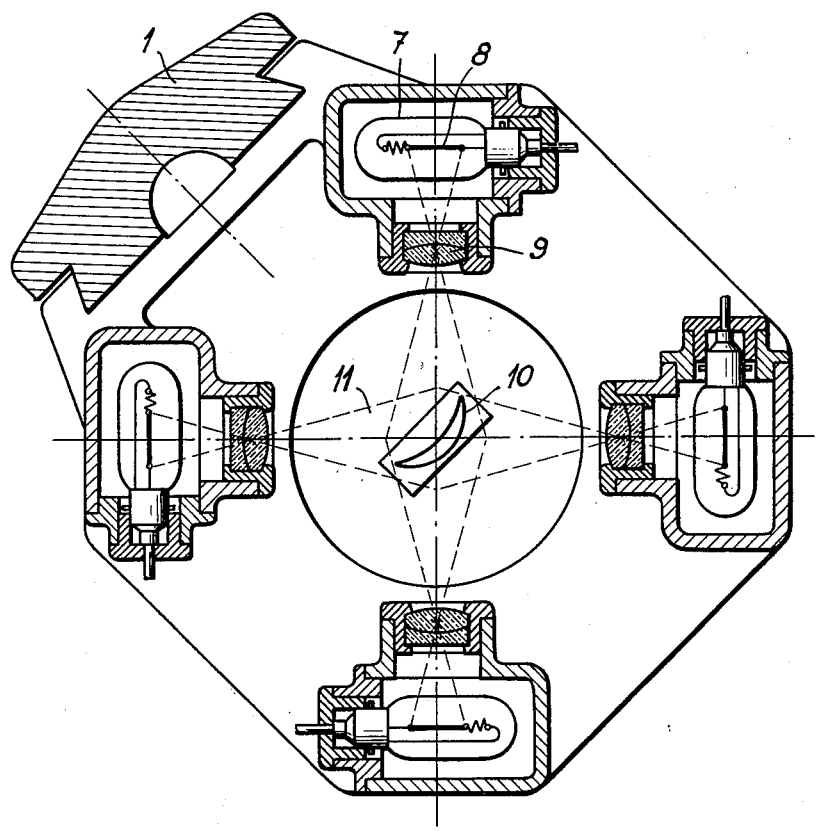
Figure 2 is a plan view at the level of the section to be studied.

It can be seen from Figure 2 that as the surface of the blade is not perpendicular to the axis of the lighting arrangements, the images of their filaments cannot be formed with equal sharpness at every point of this surface, and the apparent width of the light line will not be absolutely constant all round the blade. This produces no inconvenience in practice, since the surface of the blade is almost parallel to the optical axis of the objective lens and therefore the latter only views it in completely flat incidence, and in practice the slight variations in the width of the line are not perceptible on the projection screen.

Figure 3:
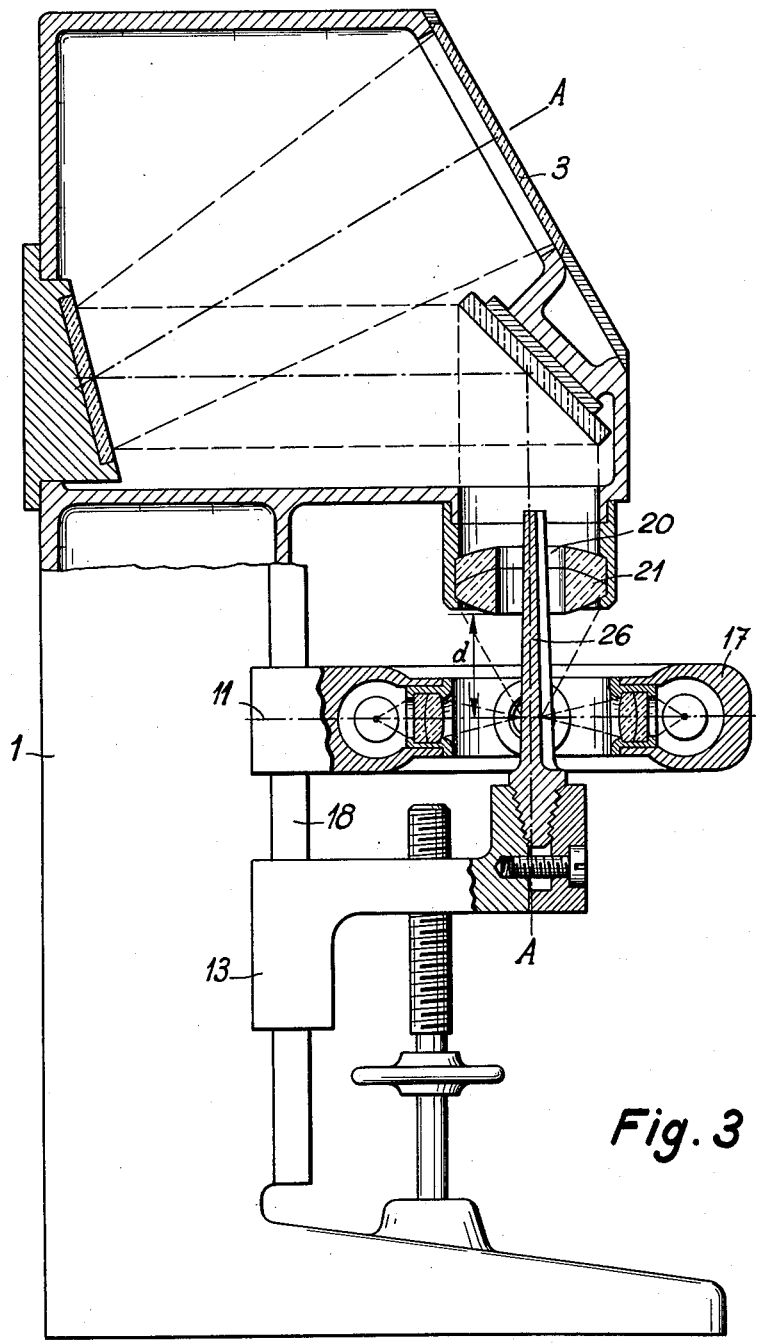
Figure 3 is a section along the optical axis of an alternative form.

In the alternative form of construction of Figure 3, the blade 26 that is being inspected is fixed to an article-carrying support 13, which can move parallel to the optical axis A—A along a slideway 18 on the projector 1. The lighting arrangements are mounted on a fixed support 17, and form, in the plane 11 which is perpendicular to the axis A—A, a continuous line of light around the blade.

The objective lens 21, the focus of which is situated in the plane 11, forms the image of the section of the blade on the screen 3 of the projector 1. This objective lens 21 has a central hole 20, the shape of which may be cylindrical for example, so as to allow the blade 26 to extend through the lens. This construction enables the sections of long and thin bodies to be controlled or examined with an objective lens of short frontal distance $d$.

Figure 4:
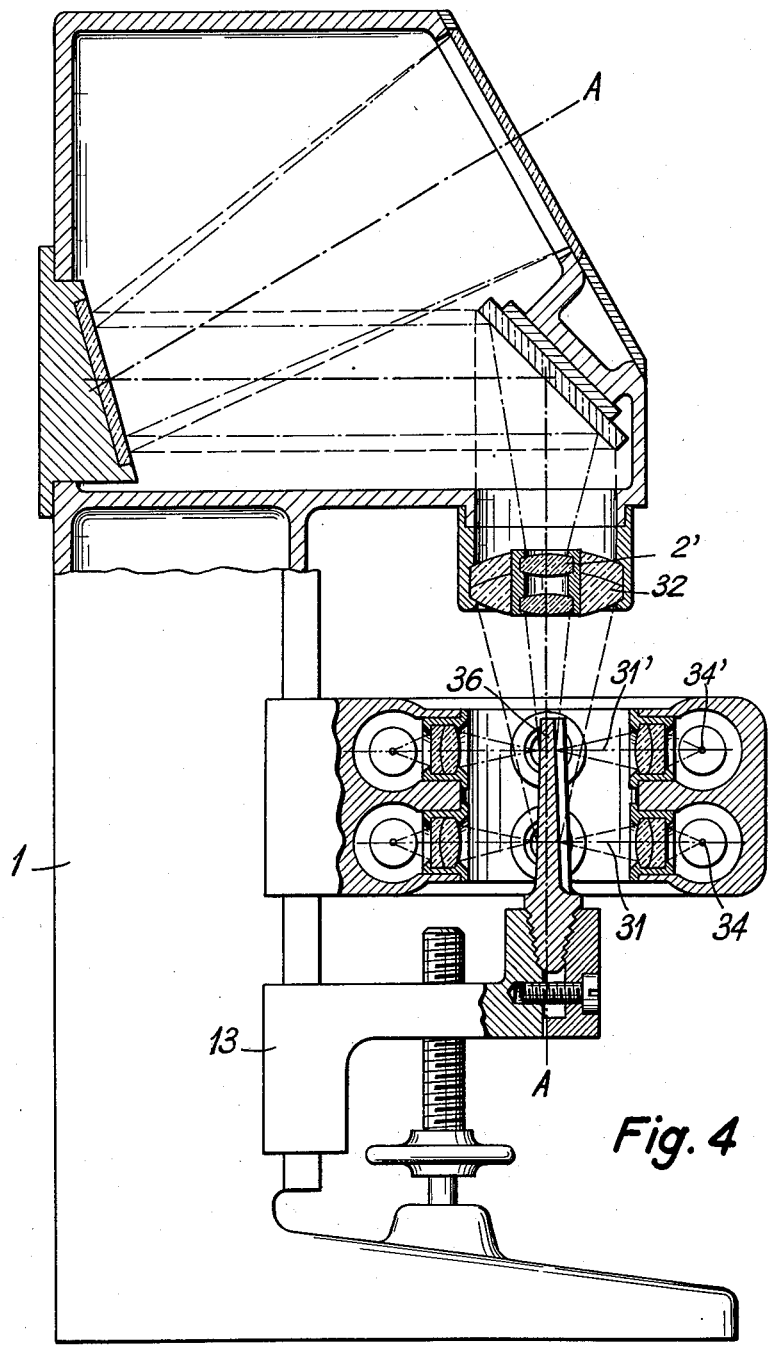
Figure 4 is a section along the optical axis of another alternative form.
Figure 5:
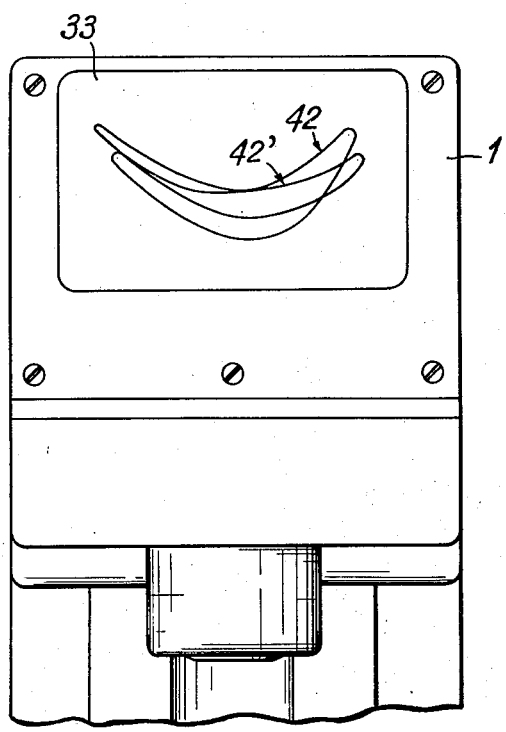
Figure 5 is a view of the screen of this alternative form.

In the modified form of construction illustrated in Figures 4 and 5, the part 36 which is under examination, a turbine blade, for instance, is fixed to an object-carrying support 13 sliding along the slideway of the projector 1. The sections of the blade 36 have to be examined in the planes 31 and 31'. For this purpose, lighting arrangements 34 and 34' are arranged all round the blade 36. Their optical axes are in the planes 31 and 31', which are both perpendicular to the optical axis A—A.

The objective lens is double, and comprises an external objective lens 32, of annular shape for example, and an inner objective lens 2'. The focus of the annular lens 32 is situated in the plane 31, and this lens projects an image 42 of the light band on to the screen 33. The inside objective lens 2' projects an image 42' of the light band situated in the plane 31' on to the same screen 33. Consequently, the observer sees simultaneously on the screen 33 the images 42 and 42' of two different sections of the blade 36.

What I claim is:

1. In an optical controlling or inspecting arrangement for verifying the cross section of members with complex profiles, a support carrying the member to be examined, a lighting device arranged all around said member, producing a plane sheet of light all around said member, said sheet tracing on said member an encircling line constituting the outline of the cross section to be verified, a projector including an objective lens the axis of which is perpendicular to the plane of said sheet of light, and a screen onto which said encircling line is projected, said support allowing a displacement of the member through a given distance parallel to the axis of said objective.

2. In an optical controlling or inspecting arrangement for verifying the cross section of members with complex profiles, a support carrying the member to be examined, a lighting device arranged all around said member, producing a plane sheet of light all around said member, said sheet tracing on said member an encircling line constituting the outline of the cross section to be verified, a projector including an objective lens the axis of which is perpendicular to the plane of said sheet of light, a central hole in said objective lens allowing said member to penetrate through it, so that the length of the member will not be limited by the focal distance of the objective, said support allowing a displacement of the member through a given distance parallel to the axis of said objective.

3. In an optical controlling or inspecting arrangement for verifying the cross section of members with complex profiles, a support carrying the member to be examined, a lighting device arranged all around said member and producing simultaneously at least two parallel plane sheets of light superposed all around said member, said sheets tracing on said member at least two encircling lines constituting the outline of two corresponding cross sections to be verified at a time, a projector including at least two coaxial objective lenses, the axis of which is perpendicular to the planes of said sheets of light, and a screen onto which said encircling lines are simultaneously projected, said support allowing a displacement of the member through a given distance parallel to the axis of said objective.

ANDRÉ MOTTU.

REFERENCES CITED

The following references are of record in the file of this patent:

UNITED STATES PATENTS

| Number | Name | Date |
| --- | --- | --- |
| 2,066,996 | Morioka | Jan. 5, 1937 |
| 2,163,124 | Jeffreys | June 20, 1939 |
| 2,256,102 | Reason | Sept. 16, 1941 |
| 2,335,127 | Ling | Nov. 23, 1943 |